United States Patent [19]

Luoma, II et al.

[11] Patent Number: 4,461,951

[45] Date of Patent: Jul. 24, 1984

[54] METHOD OF MONITORING THE TEMPERATURE OF A STERILE DOCKING CUTTING MEANS

[75] Inventors: Robert P. Luoma, II; Helen E. Roxlo, both of Newark, Del.

[73] Assignee: E. I. Du Pont de Nemours and Company, Wilmington, Del.

[21] Appl. No.: 408,416

[22] Filed: Aug. 16, 1982

[51] Int. Cl.³ ............................................. H05B 1/02
[52] U.S. Cl. ................................ 219/497; 340/588; 219/505; 219/241; 219/494; 128/303.14
[58] Field of Search ............... 219/490, 491, 494, 504, 219/505, 501, 497, 499, 221, 240, 241; 128/303.13, 303.14, 303.17, 303.1; 340/588

[56] References Cited

U.S. PATENT DOCUMENTS

| Re. 30,190 | 1/1980 | Shaw . |
| 3,679,871 | 7/1972 | Evalds . |
| 3,789,190 | 1/1974 | Orosy et al. . |
| 3,869,597 | 3/1975 | Strange . |
| 3,924,102 | 12/1975 | Hanekom . |
| 4,081,660 | 3/1978 | Uffer et al. . |
| 4,219,025 | 8/1980 | Johnson . |
| 4,243,875 | 1/1981 | Chang . |

Primary Examiner—M. H. Paschall

[57] ABSTRACT

There is disclosed a method of monitoring the temperature of a cutting element in a sterile docking apparatus for splicing two sterile thermoplastic tubes together by using a resistor-heated cutting means, the method comprises (1) supplying a constant current to the resistor; (2) measuring the initial voltage of the resistor; (3) calculating, according to predetermined empirical relationship(s), the voltage, time or both required to achieve a desired cutting means temperature if the initial voltage is within a suitable range, (4) measuring repeatedly the voltage of the resistor and the time to determine whether (a) the voltage reaches the calculated voltage within a specified time frame or (b) the calculated time has been reached within a specified voltage range and (5) splicing the tubes with the cutting means if the time frame or voltage range is met. The method is also applicable to other resistor-heated elements in other devices having a constant heat load environment.

19 Claims, 3 Drawing Figures

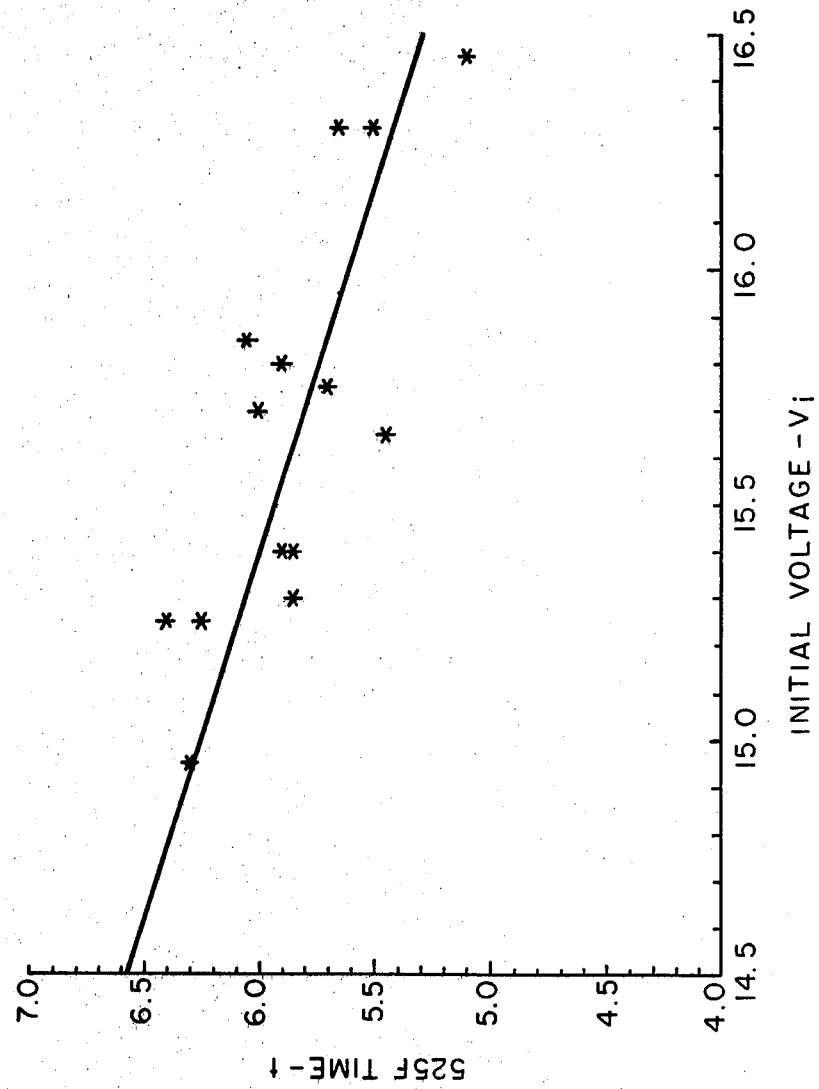
F I G. 3

METHOD OF MONITORING THE TEMPERATURE OF A STERILE DOCKING CUTTING MEANS

BACKGROUND OF THE INVENTION

This invention relates to a process for monitoring the temperature of a resistance heating element and, more specifically, relates to a method of monitoring the temperature of a cutting means in an apparatus for forming a sterile connection (sterile docking) between two tubes.

U.S. patent application Ser. No. 267,291 filed on June 4, 1981, now U.S. Pat. No. 4,369,779, discloses an apparatus for forming a sterile connection comprising a cutting means, means adapted to heat said cutting means, a pair of mounting blocks adapted to receive and hold two tubes to be joined, means to provide movement between said blocks and said cutting means to a position such that the cutting means is between said blocks and traversing where the blocks are adapted to receive tubes, means adapted to realign said blocks to a position where two different tube ends are aligned with and facing each other, and means to separate said blocks and said cutting means while urging said blocks together. The application discloses that the process of joining two thermoplastic tubes together transversely of the axis of each tube comprises forming a continuous molten seal between a heated cutting surface and a transverse section of each said tube thereby maintaining a seal between the interior and exterior of said tubes, joining the respective molten ends of said tubes together to form a joint between said tubes while maintaining said seal.

During the use of the sterile docking apparatus according to the aforesaid U.S. application, it has been found that, when the cutting means is a laminated heating element heated by a resistor, various phenomena occasionally occur which result in unsatisfactory performance. These phenomena include (1) when the cutting means is mounted in the sterile docking device, electrical contact resistance may be too high or erratic; (2) the composite cutting means may possess insulating bubbles or may delaminate; (3) convection heat losses may be too great; (4) when a battery is used to supply current to the resistor, the battery current may drop excessively; (5) the current source may malfunction, (6) cutting means may possess shorts or open circuits; (7) or the cutting means may have an initial resistance which is significantly higher or lower than that desired. The foregoing problems may cause the cutting means to fail to heat to the desired temperature within an expected time, may cause the resistor to become too hot within an expected time indicating an unknown change in the correlation between resistor temperature and the temperature of the outside surface of the cutting means, or may cause the cutting means itself to become too hot within an expected time. Improper cutting means temperature can result in a poor mechanical joint and/or a nonsterile joint. A method which minimizes occurrences of either result is quite desirable.

Methods of controlling the temperature of a heating element and methods for shutting down a heating element are known. These methods generally involve a fixed heating element and an initial set-up of the circuit elements to accommodate the specific heating element used, whereas in the aforesaid sterile docking apparatus the heating element (cutting means) is used only once and then replaced. U.S. Pat. No. 3,679,871 issued to Evalds on July 25, 1972 discloses an alternate-current heater using resistance sensing of the heater element to control power to the heater to maintain a predetermined temperature. U.S. Pat. No. 3,789,190 issued to Orosy et al. on Jan. 29, 1974 discloses a control system that uses variable resistance of the heating element to control temperature by alternately applying heating power and sampling resistance several times per second to maintain a predetermined temperature. Other patents disclosing similar systems include U.S. Pat. Nos. 3,869,957 and 3,924,102.

U.S. Pat. No. 4,081,660, issued to Uffer et al. on Mar. 28, 1978, discloses an electric heater shutdown circuit connectable between an electric current source and a heating element in an electric heater and comprising electronic means for shutting off electric current to the heating element when the heating element reaches a predetermined temperature, an electronic means for maintaining the flow of electric current to the heating element shut off after the heating element cools to a temperature below said predetermined temperature, said electronic means for maintaining said electric current shutoff being disabled only upon disconnection of said shutdown circuit from the current source for a predetermined period of time.

U.S. Pat. No. Re. 30,190, reissued on Jan. 15, 1980 to Shaw, discloses a surgical cutting instrument which includes an electrically heated cutting edge and an automatic control system for maintaining the cutting edge at a constant high temperature for sterilizing the blade, cutting tissue, and cauterizing the incised tissue. The blade comprises an electrically heatable element having a plurality of sections which form portions disposed in the region along the tissue-cutting edge and connection means for providing electrical connections to each of said sections for independently supplying electrical power thereto for maintaining the resistance of each of said sections at a substantially constant selected value.

U.S. Pat. No. 4,219,025 issued on Aug. 26, 1980 to Johnson discloses a surgical cutting instrument similar to that disclosed in U.S. Pat. No. Re. 30,190. The patent discloses that the instantaneous temperature of the cutting edge is monitored by measuring the resistance of the heating element or elements and the monitoring signal thus derived provides an inferred value for temperature which may be used to control the power supply to portions or segments of the heating element.

U.S. Pat. No. 4,243,875 issued to Chang on Jan. 6, 1981 discloses a temperature control system for a resistance element which is heated by a power supply connected to it by a switching member, the switching member being controlled by an electronic circuit which is operative to produce alternate on cycles and off cycles whose durations are controlled by separate time constants. The durations of the alternate cycles respectively set the higher and lower temperature limits within which the heating element temperature remains.

SUMMARY OF THE INVENTION

The present invention provides, for a constant heat load environment, a method of monitoring the temperature of a heating element which is heated by a resistor of known positive or negative temperature coefficient of resistance and of known approximate resistance but whose individual resistance has not been established; said method comprising (1) supplying a constant current to the resistor;
(2) measuring the initial voltage across the resistor;
(3) calculating, according to predetermined empirical relationship(s), the voltage, time or both required to achieve a desired heating element temperature provided that the initial voltage is from a minimum value $V_1$, to a maximum value, $V_2$; and
(4) measuring repeatedly the voltage and time to determine whether (a) the voltage of the resistor has reached the calculated voltage at or after a desired time, $T_1$, and before a desired time, $T_2$, or (b) the calculated time has been reached after a measured voltage of $V_3$ and before a measured voltage of $V_4$.

Preferably, the method is used to monitor the temperature of the cutting means in an apparatus for sterile connection wherein two closed end thermoplastic tubes are sterily spliced with a hot cutting means.

BRIEF DESCRIPTION OF THE DRAWING

FIG. 3 is a plot of time to reach 274° C. versus initial voltage.

DETAILED DESCRIPTION OF THE INVENTION

Figure 1:
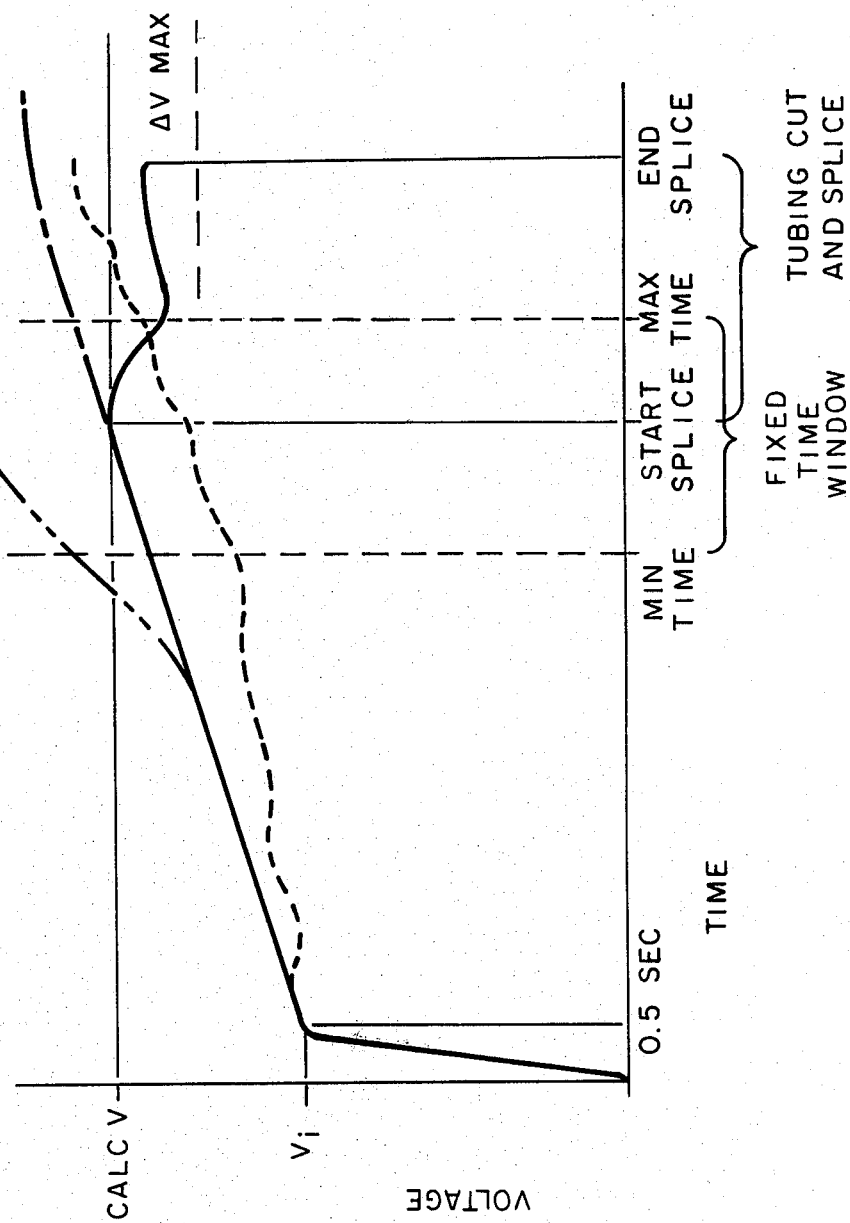
FIG. 1 is a graph depicting a typical voltage-time relationship for a resistor-heated cutting means in a sterile docking apparatus.

The method of the invention is used with the sterile docking apparatus described in U.S. patent application Ser. No. 267,291, now U.S. Pat. No. 4,369,779, and forms part of the process described in said application. Preferably, the method of the invention is used with the sterile docking apparatus and system specifically described and claimed in copending U.S. patent application Ser. No. 408,418, filed simultaneously herewith. Pertinent passages of both of these applications are incorporated herein by reference. The method of the invention is generally applicable to resistance heaters which are operated in a constant heat load environment whether or not they are used as a cutting means in said sterile docking apparatus. In regard to the cutting means described in the U.S patent application Ser. No. 267,291, now U.S. Pat. No. 4,369,779, the method of the invention is only applicable to resistance heated cutting means. As used herein, the terms "cutting means" and "heating element" are meant to be interchangeable, although a heating element may have other uses than as a cutting means. For the sterile docking apparatus of the aforesaid simultaneously filed application, it is desirable that the cutting means reaches the required operating temperature of from about 232° C. (450° F.) to 343° C. (650° F.) within about 5–9 seconds.

Preferably, the cutting means used in the method of the invention is that disclosed in copending U.S. application Ser. No. 408,417, filed simultaneously herewith. This heating element consists essentially of, as an outer layer, a folded sheet of metal having a thermal conductivity of at least about 173 watts/m °K. at a thickness of 0.10 mm (4 mil) and a tensile yield strength of at least about $34 \times 10^4$ kPa (5000 psi) at 0.10 mm thickness; a resistor disposed inside the fold of said folded sheet of metal; and a layer of dielectric adhesive, stable to about 260° C., between inner surfaces of the folded sheet of metal and surfaces of the resistor, thereby bonding the resulting structure together. Relevant passages of this patent application directed to a heating element are incorporated herein by reference. For the method of the invention the resistor has either a positive or a negative temperature coefficient of resistance but preferably has a positive one because materials having such are more readily available. In the present method, the temperature coefficient of resistance of the material used to make the resistors of the heating elements has to be constant within about 2%. Hence, when a series of heating elements are to be used in the same apparatus, the composition, including the level of impurities, of the material used to make the elements must be fairly well controlled. The magnitude of the temperature coefficient of resistors suitable for the present invention is at least $0.1 \times 10^{-3}/°K$. Most preferably, the folded sheet of metal is made of copper; the resistor is an etched foil resistor made of stainless steel; the adhesive is an acrylic adhesive; and the heating element has a thickness of from about 0.25 mm (10 mil) to about 0.36 mm (14 mil).

Since the cutting means is replaced after each splice by a new one, establishment of a calibration curve precisely characteristic of each heating element is not feasible. Laminated resistance heating elements are produced by a photo-etching process which results in modest variations in the width, and hence the cross-sectional area of the elements, thereby creating a corresponding variation in resistance. This variation in the initial resistance of the resistor of the cutting means significantly affects the time required for the resistor to heat to a desired temperature under a constant applied current. Resistors having high initial resistance heat faster than those of low initial resistance. Also, the resistance change of the higher initial resistance elements when heated to a desired temperature is greater than the resistance change of the lower initial resistance elements when heated to the same temperature. These phenomena agree with established theory. However, to calculate the exact magnitude of the variables as they are influenced by variable heat flux phenomena becomes very complex and time consuming.

It has been discovered that for a constant heat load environment the resistance of a resistor at a predetermined temperature and the time required to reach that temperature can be predicted reliably by use of two empirical relationships. Normally, predicting the resistance change and monitoring it is sufficient to determine when the heating element surface has reached the desired temperature. However, if abnormal phenomena mentioned previously occur, the ability to predict the heating element surface temperature as a function of resistance is impaired. In accordance with the present invention this impairment can be circumvented by monitoring the time for the resistor to heat the heating element to the desired temperature. The exact relationships used depend upon the desired temperature, the operating environment, the method by which the cutting means is fabricated, and the material from which it is fabricated. In using the method of the invention, these factors are maintained rather constant. The relationships also depend on the magnitude of the constant current applied. Moreover, to make design of the circuitry manageable resistors having actual resistances within a range of about 10% of a nominal value are selected for establishing the empirical relationships. Using, in sequence, a series of heating elements of the same composition, a constant current is applied and the initial voltage, the voltage when the desired temperature is reached, and the time to reach that temperature are recorded. In lieu of measuring the time when the desired temperature is reached, the voltage for reaching the desired temperature could be calculated after the voltage empirical relationship is established and the time to reach the calculated voltage could be measured. From these data, the "best fit curves" for relating the final voltage to the initial voltage and the final time to the initial voltage are determined using methods well known in the art. These equations are then utilized in the method of the invention.

In the most preferred embodiment of the invention, the heating element has an etched stainless steel resistor, an outer layer of copper foil and an acrylic adhesive. When a heating element of this construction and composition is used in the sterile docking device described in simultaneously filed, copending U.S. application Ser. No. 408,418 the empirical relationship for calculating the voltage or resistance at 274° C. (525° F.) is given by $$V = 1.16 V_i + 0.66$$

The empirical relationship for predicting the time to reach 525° F. is given by $$t = -0.69 V_i + 16.42$$

where $V_i$ is the initial voltage, V is the voltage at 274° C. and t is the time required to reach 274° C. These empirical relationships were established for the situation wherein the heating element or cutting means is supplied with current by a battery capable of delivering a maximum of 20 volts and a constant current of 1.35 amps is to be applied due to a desire to reach the predetermined temperature within a relatively short time.

In the method of the invention after a constant current is supplied to the resistor, the initial voltage of the resistor is measured. Preferably, measurement of the initial voltage is performed about 0.5 second after the current is applied, thereby providing sufficient time for contact conditions to be stabilized. To assure proper heating of the cutting means within the desired time frame the initial voltage should be from about 11.1 to about 18.0 volts, preferably, from about 14.2 to about 16.5 volts. If the initial voltage is not within the herein prescribed range, then the cutting means should not be used but should be rejected and another cutting means utilized. The acceptable range of initial voltages is determined at the upper end by the maximum voltage available from the power supply and on the lower end by the desire to minimize the heat-up time, thereby minimizing, for the sterile docker, the cycle time to make a splice. Another consideration affecting the lower end is a desire to supply heat somewhat rapidly to overcome the quenching effect of the cool tube polymer during splicing. Once a cutting means having the requisite initial voltage is obtained, the voltage required to achieve a desired cutting means temperature is then calculated. In the most preferred embodiment, the operating temperature of the cutting means is about 274° C. (525° F.).

The voltage of the resistor and the time are then measured repeatedly to determine whether or not (a) the calculated voltage has been reached at or after a desired time, $T_1$, and before a desired time, $T_2$, or (b) the calculated time has been reached after a measured voltage, $V_3$ and before a measured voltage, $V_4$. Preferably a time window, ($T_1$ and $T_2$) is used for reaching the calculated voltage. Preferably $T_1$ and $T_2$ are 5 and 9 seconds, respectively, when the desired temperature is from about 232° C. (450° F.) to about 343° C. (650° F.) and are 5 and 7 seconds, respectively, when the desired temperature is from about 232° C. (450° F.) to about 316° C. (600° F.). If the cutting means fails to heat up to the desired temperature, as indicated by a failure of the resistor to reach the calculated voltage within the foregoing time span, then the occurrence of one or more of the previously mentioned problems is probable, e.g., excessive convection heat losses or erratic contact resistance. If it reaches the desired voltage too soon, then problems such as delamination and insulating bubbles are suggested.

It has been found that for sterile docking devices of the same construction and the use therein of cutting means of the same construction, heat transfer from the cutting means to the cutting means holder, mass of the cutting means and the current supplied to the circuit are relatively constant from one device to another and one cutting means to another.

FIG. 1 shows a typical voltage-time relationship for a cutting means operated under various conditions, including splicing the tubes, in a sterile docking device. The solid curve represents the typical cutting means voltage trace during a complete tube splicing cycle. A 1.35 amps current is turned on at time, t=0. The voltage quickly rises to reflect the initial resistance of the cutting means, $V_i$, at 0.5 sec. As the cutting means heats up, the resistance and, therefore, the voltage rise steadily. In the depicted embodiment, as the voltage reaches the calculated voltage, V, within the calculated time window, which reflects the desired temperature, and an acceptable heat flux condition, the sterile docking device initiates the tubing cut and joining sequence. The tube cutting and joining sequence cools the cutting means slightly as seen by the dip in the voltage curve. When the tubing cut and joining sequence is complete, the current to the blade is turned off. If the cut and joining sequence had not been executed, the cutting means would have continued heating to an equilibrium condition indicated by the single dot intermittent curve.

The continuous dashed curve represents a voltage trace which indicates bad electrical contacts or a high convective heat flux removing heat too rapidly from the cutting means during heat up. In this situation the calculated voltage, V, is not reached before the maximum time so the control method rejects this splice cycle. The double dash intermittent curve represents the voltage trace that indicates the occurrence of a delaminated blade problem during heat up. As the blade delaminates the heat is not conducted efficiently from the resistor inside the cutting means to the outer surface of the cutting means. Therefore, the resistor heats up more rapidly than normal as shown by the double dash intermittent curve and the calculated voltage, V, is reached before the minimum time so that the control method rejects this splice cycle.

In a sterile docking device utilizing the method of the invention, monitoring and calculating are accomplished by a digital microcomputer in which analog voltage is converted to a digital signal about once per millisecond. The conversion rate is not important so long as significant changes in voltage do not occur between samples. A rate of about once per 50 milliseconds is suitable with the preferred cutting means. The method of the invention should also be suitable for use in an analog control system.

In another embodiment, the method of the invention includes the additional step of continuing to monitor the voltage of the resistor during the sterile docking cycle. Before docking, the operator generally drains the tubing so that no liquid remains in the area to be spliced. If liquid remains in the tube, it cools the cutting means and may prevent a good sterile dock from occurring. Cooling of the cutting means can be detected by monitoring the voltage of the resistor since the resistance of the cutting means changes with temperature. It has been determined that during sterile docking the voltage of the resistor normally drops about 0.3 to 0.5 volts. If a voltage drop greater than about 0.6 volts ($\Delta V_{max}$ in FIG. 1) is observed during docking, the operator should assume that an unsatisfactory splice was made and should obtain proper medical attention before attempting further splices.

Although the method of the invention has been described according to the most preferred embodiment, it will be readily apparent to those skilled in the art that with appropriate changes the method is applicable to other resistive heating elements, other desired heating times, and other devices provided that sufficient knowledge about the heating cycle is available. One would establish the range of initial voltages, $V_1$-$V_2$, which would permit obtainment of the desired temperature within the desired time frame. One would then establish the empirical relationships which describe the heat flux and resistance change of representative samples of the resistor. Substitution of these determined parameters for the comparable ones given herein for the most preferred embodiment would permit temperature monitoring pursuant to the present invention. The method of the invention is particularly applicable to heating elements which are relatively thin, about 0.13 to about 0.76 mm (5 to 30 mil) in thickness since it is advantageous that there be a rapid heat response between the resistor and the working surface of the cutting means.

ESTABLISHMENT OF THE EMPIRICAL RELATIONSHIPS

For determination of the voltage relationship 41 blades are used in a cutting means holder and contact assembly outside the sterile docking device. A clamp is used to hold the contacts and blade firmly together, thereby minimizing contact resistance. The cutting means holder is cooled between each run and then allowed to wait a few minutes to achieve temperature equilibrium. For determination of the time relationship 20 blades are used in a sterile docking device pursuant to that described and claimed in copending U.S. patent application Ser. No. 408,418, filed concurrently herewith. The blades for both determinations are heating elements (cutting means) pursuant to those described and claimed in copending U.S. patent application Ser. No. 408,417, filed concurrently herewith.

Figure 2:
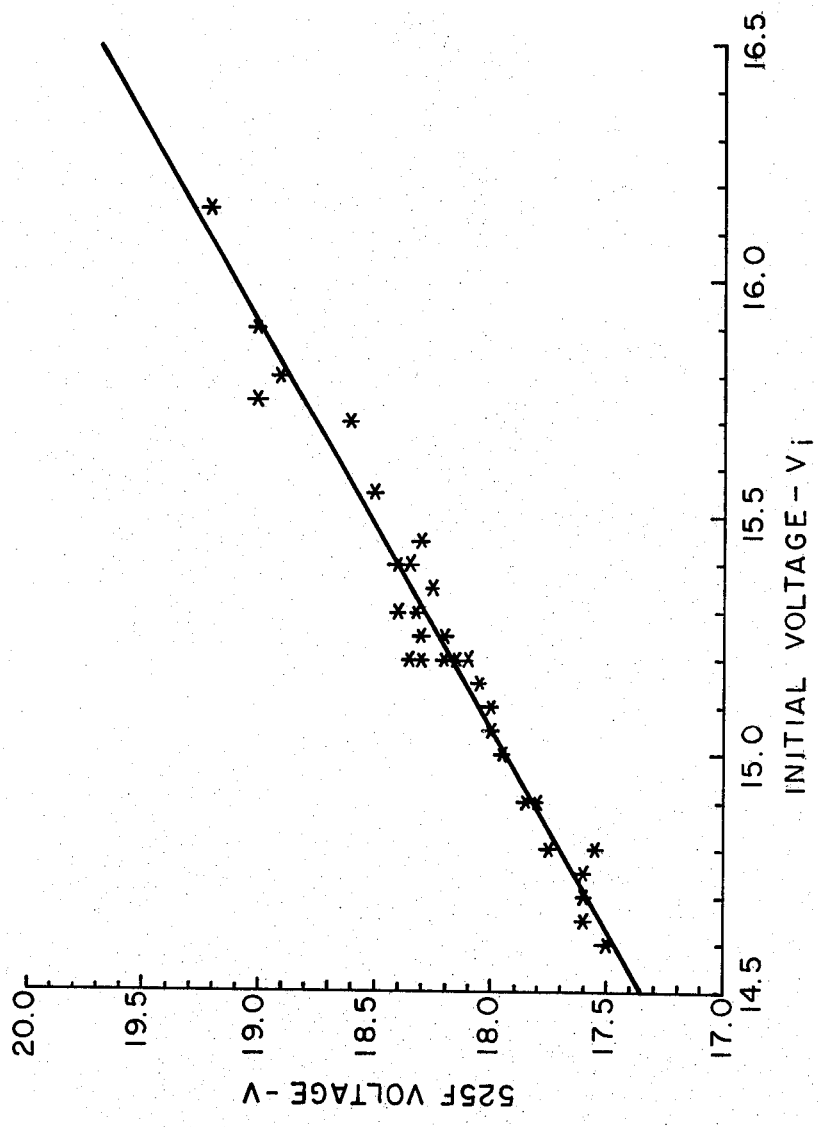
FIG. 2 is a plot of voltage at 274° C. versus initial voltage.

A thermocouple is used to record the cutting means temperature. The voltage of the resistor and temperature of the cutting means are measured and recorded on a strip chart recorder from which the initial voltage, $V_i$, the voltage at 274° C. (525° F.) and time could be obtained. The initial voltage is measured 0.5 second after a constant current of 1.35 amps was applied. The resulting data are presented in FIG. 2 wherein the voltage at 274° C. is plotted versus the initial voltage. Measurements for five blades are not used due to abnormal phenomena. Using a least squares analysis the "best straight" line through the data is obtained. The empirical relationship eventually obtained thereby with some adjustment of the intercept constant is $$V = 1.16 V_i + 0.66.$$

A plot of time required for the cutting means to reach 274° C. versus the initial voltage is presented in FIG. 3. From this plot is derived by least squares analysis the empirical relationship $$t = -0.69 V_i + 16.42.$$

We claim:
1. In a constant heat load environment, a method of monitoring the temperature of a heating element which is heated by a resistor of known positive or negative temperature coefficient of resistance and of known approximate resistance but whose individual resistance has not been established; said method comprising
   (1) supplying a constant current to the resistor;
   (2) measuring the initial voltage across the resistor;
   (3) calculating, according to predetermined empirical relationship(s), the voltage, time or both required to achieve a desired heating element temperature provided that the initial voltage is from a minimum value, $V_1$, to a maximum value, $V_2$; and
   (4) measuring repeatedly the voltage and time to determine whether (a) the voltage of the resistor has reached the calculated voltage at or after a desired time, $T_1$, and before a desired time, $T_2$, or (b) the calculated time has been reached after a measured voltage of $V_3$ and before a measured voltage of $V_4$.

2. A method according to claim 1 wherein for step (3) the voltage and time are calculated and for step (4) the voltage and time are repeatedly measured to determine whether the voltage of the resistor has reached the calculated voltage at or after a desired time, $T_1$, and before a desired time, $T_2$.

3. A method according to claim 2 wherein in step (3) the voltage and time are calculated according to the relationships $$V = (C_1 V_i + C_2) + C_3$$

$$t = (K_1 V_i + K_2) + K_3$$

wherein
   V is the voltage across the resistor when the heating element is at the desired temperature;
   $V_i$ is the initial voltage;
   $C_1$ is the slope of best straight line relating to $V_i$ values to V;
   $C_2$ is an extrapolated value of the voltage when $V_i$ is zero;
   $C_3$ is the tolerance in the voltage;
   t is the time required for the heating element to reach the desired temperature;
   $K_1$ is the slope of the best straight line relating $V_i$ values to t values;
   $K_2$ is the extrapolated value for time when $V_i$ is zero; and
   $K_3$ is the tolerance in time; $C_1$, $C_2$, $C_3$, $K_1$, $K_2$ and $K_3$ being determined with a sampling of similar resistors.

4. A method according to claim 3 wherein the desired heating element temperature is from about 232° C. to about 343° C. and the heating element consists essentially of, as an outer layer, a folded sheet of metal having a thermal conductivity of at least about 173 watts/m°K. at a thickness of 0.10 mm and a tensile yield strength of at least about $34 \times 10^4$ kPa at a 0.10 mm thickness; a resistor disposed inside the fold of said folded sheet of metal; a layer of dielectric adhesive, stable to about 260° C., between inner surfaces of said folded sheet of metal and surfaces of said resistor, thereby bonding the resulting structure together.

5. A method according to claim 4 wherein the desired heating element temperature is from about 232° C. to about 316° C.; the folded sheet of metal is made of copper; the resistor is an etched foil resistor made of stainless steel; the adhesive is an acrylic adhesive; and the heating element has a thickness of from about 0.25 mm to about 0.36 mm.

6. A method of monitoring the temperature of a cutting means in an apparatus for sterile connection wherein two thermoplastic tubes are sterilely spliced with a hot cutting means and said cutting means is a heating element which is heated by a resistor of known positive or negative temperature coefficient of resistance and of known approximate resistance but whose individual resistance has not been established; said apparatus having a constant heat load environment; said method comprising
   (1) supplying a constant current to the resistor;
   (2) measuring the initial voltage across the resistor;
   (3) calculating, according to predetermined empirical relationship(s), the voltage, time or both required to achieve a desired heating element temperature provided that the initial voltage is from a minimum value, $V_1$, to a maximum value, $V_2$; and
   (4) measuring repeatedly the voltage and time to determine whether (a) the voltage of the resistor has reached the calculated voltage at or after a desired time, $T_1$, and before a desired time, $T_2$, or (b) the calculated time has been reached after a measured voltage of $V_3$ and before a measured voltage of $V_4$.

7. A method according to claim 6 wherein for step (3) the voltage and time are calculated and for step (4) the voltage and time are repeatedly measured to determine whether the voltage of the resistor has reached the calculated voltage at or after a desired time, $T_1$, and before a desired time, $T_2$.

8. A method according to claim 7 wherein in step (3) the voltage and time are calculated according to the relationships $$V = (C_1 V_i + C_2) + C_3$$

$$t = (K_1 V_i + K_2) + K_3$$

wherein
   V is the voltage across the resistor when the heating element is at the desired temperature;
   $V_i$ is the initial voltage;
   $C_1$ is the slope of best straight line relating $V_i$ values to V;
   $C_2$ is an extrapolated value of the voltage when $V_i$ is zero;
   $C_3$ is the tolerance in the voltage;
   t is the time required for the heating element to reach the desired temperature;
   $K_1$ is the slope of the best straight line relating $V_i$ values to t values;
   $K_2$ is the extrapolated value for time when $V_i$ is zero; and
   $K_3$ is the tolerance in time; $C_1$, $C_2$, $C_3$, $K_1$, $K_2$ and $K_3$ being determined with a sampling of similar resistors.

9. A method of monitoring the temperature of a cutting means in an apparatus for sterile connection wherein two thermoplastic tubes are sterilely spliced with a hot cutting means and said cutting means is a heating element consisting essentially of, as an outer layer, a folded sheet of metal having a thermal conductivity of at least about 173 watts/m°K. at a thickness of 0.10 mm and a tensile yield strength of at least about $34 \times 10^4$ kPa at a 0.10 mm thickness; a resistor disposed inside the fold of said folded sheet of metal; and a layer of dielectric adhesive, stable to about 260° C., between inner surfaces of said folded sheet of metal and surfaces of said resistor, thereby bonding the resulting structure together; said resistor having a known approximate resistance and known positive or negative temperature coefficient of resistance but the actual resistance of said resistor being unknown; said method comprising
   (1) supplying a constant current to the resistor;
   (2) measuring the initial voltage across the resistor;
   (3) calculating, according to predetermined empirical relationships, the voltage and time required to achieve a desired heating element temperature provided that the initial voltage is from a minimum value $V_1$ to about a maximum value $V_2$; and
   (4) measuring repeatedly the voltage and time to determine whether (a) the voltage of the resistor has reached the calculated voltage at or after a desired time, $T_1$, and before a desired time, $T_2$, or (b) the calculated time has been reached after a measured voltage of $V_3$ and before a measured voltage of $V_4$.

10. A method according to claim 9 wherein in step (3) the voltage and time are calculated according to the relationships $$V = (C_1 V_i + C_2) + C_3$$

$$t = (K_1 V_i + K_2) + K_3$$

wherein
   V is the voltage across the resistor when the heating element is at the desired temperature;
   $V_i$ is the initial voltage;
   $C_1$ is the slope of best straight line relating $V_i$ values to V;
   $C_2$ is an extrapolated value of the voltage when $V_i$ is zero;
   $C_3$ is the tolerance in the voltage;
   t is the time required for the heating element to reach the desired temperature;
   $K_1$ is the slope of the best straight line relating $V_i$ values to t values;
   $K_2$ is the extrapolated value for time when $V_i$ is zero; and
   $K_3$ is the tolerance in time; $C_1$, $C_2$, $C_3$, $K_1$, $K_2$ and $K_3$ being determined with a sampling of similar resistors.

11. A method according to claim 10 wherein the resistor has a positive coefficient of resistance.

12. A method according to claim 11 wherein the folded sheet of metal is made of copper; the resistor is an etched foil resistor made of stainless steel; the adhesive is an acrylic adhesive; and the heating element has a thickness of from about 0.25 mm to about 0.36 mm.

13. A method according to claim 9 wherein in step (3) the voltage is calculated according to the relationship $$V = (C_1 V_i + C_2) \pm C_3$$

wherein V is the voltage across the resistor when the heating element is at the desired temperature;

$V_i$ is the initial voltage; $C_1$ is the slope of the best straight line relating $V_i$ values to V; $C_2$ is an extrapolated value of the voltage when $V_i$ is zero; $C_3$ is the tolerance in the voltage; the folded sheet of metal is made of copper; the resistor is an etched foil resistor made of stainless steel; the adhesive is an acrylic adhesive; the heating element has a thickness of from about 0.25 mm to about 0.36 mm; $T_1$ is about 5 seconds and $T_2$ is about 9 seconds.

14. A method according to claim 13 wherein $T_1$ is about 5 seconds and $T_2$ is about 7 seconds.

15. A method according to claim 14 wherein $V_1$ is about 11.1 volts and $V_2$ is about 18.0 volts.

16. A method according to claim 15 wherein the initial voltage of the resistor is measured about 0.5 second after the current is supplied.

17. A method according to claim 16 wherein $V_1$ is about 14.2 volts and $V_2$ is about 16.5 volts.

18. A method according to claim 17 wherein the voltage is measured in step (4) about once per millisecond.

19. A method according to claim 6, 9, 13 or 18 wherein the voltage is measured repeatedly during splicing.

* * * * *

UNITED STATES PATENT AND TRADEMARK OFFICE
CERTIFICATE OF CORRECTION

PATENT NO. : 4,461,951
DATED : July 24, 1984
INVENTOR(S) : Robert Paul Luoma, II and Helen Elizabeth Roxlo It is certified that error appears in the above—identified patent and that said Letters Patent is hereby corrected as shown below:

In Claim 3, lines 4 and 5, Claim 8, lines 4 and 5, and Claim 10, lines 4 and 5, the equations should read as follows:

$$V = (C_1 V_i + C_2) \pm C_3$$
$$t = (K_1 V_i + K_2) \pm K_3.$$

Signed and Sealed this

Fifteenth Day of January 1985

[SEAL]

Attest:

*Attesting Officer*

GERALD J. MOSSINGHOFF

*Commissioner of Patents and Trademarks*